Figure 1:
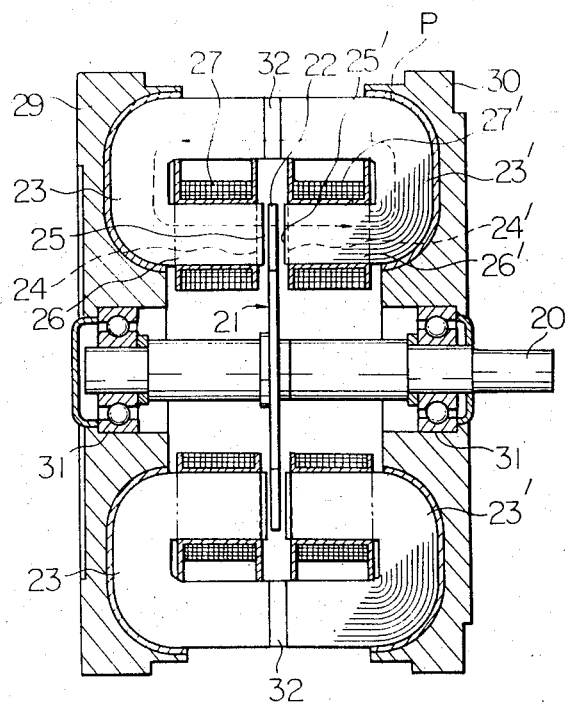

United States Patent [19]
Inaba et al.

[11] 3,784,850
[45] Jan. 8, 1974

[54] ELECTRIC PULSE MOTOR

[75] Inventors: Seiuemon Inaba, Kawasaki; Yo Ikebe; Sakae Yamamura, both of Tokyo, all of Japan

[73] Assignee: Fujitsu Limited, Kawasaki-shi, Japan

[22] Filed: Dec. 27, 1971

[21] Appl. No.: 212,156

[30] Foreign Application Priority Data
Dec. 28, 1970 Japan............................. 45/132283
Dec. 28, 1970 Japan............................. 45/132285
Dec. 30, 1971 Japan............................. 46/134169

[52] U.S. Cl. ............................... 310/49, 310/268
[51] Int. Cl. ............................................ H02k 37/00
[58] Field of Search............... 310/268, 49, 162–164

[56] References Cited
UNITED STATES PATENTS
3,483,406  12/1969  Inaba et al. ..................... 310/268 X
3,469,123  9/1969  Inaba et al. ..................... 310/268 X
570,914    11/1896  Dorman............................. 310/268 X
3,436,581  4/1969  Van Donselaar................... 310/268
3,466,479  9/1969  Jarret et al......................... 310/168

Primary Examiner—D. F. Duggan
Attorney—Allan Ratner

[57] ABSTRACT

The disclosure relates to an improved electric pulse motor having an arrangement wherein, with respect to a rotor element having a number of rotor-teeth, a stator assembly including a number of geometrically and electrically paired laminated U-shape stator elements is assembled based upon the conventional arrangement, but, the rotor element is provided with a specific construction for strengthening the rotor-teeth, so that radially extended rotor-teeth are reduced in axial thicknesses so as not to increase moment of inertia, making it possible to obtain a large magnetic attractice force from the stator elements so as to provide a large output torque.

The stator elements are also provided with a structure and members to provide a large magnetic attractice force so that a large output torque is obtainable from the electric pulse motor.

10 Claims, 13 Drawing Figures

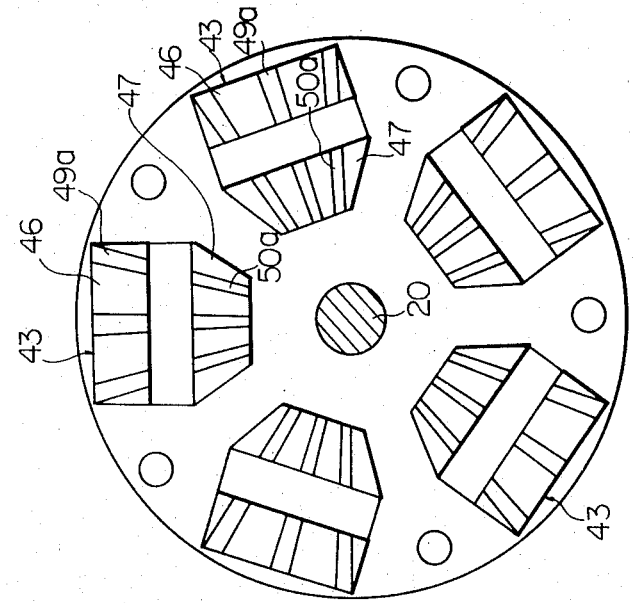
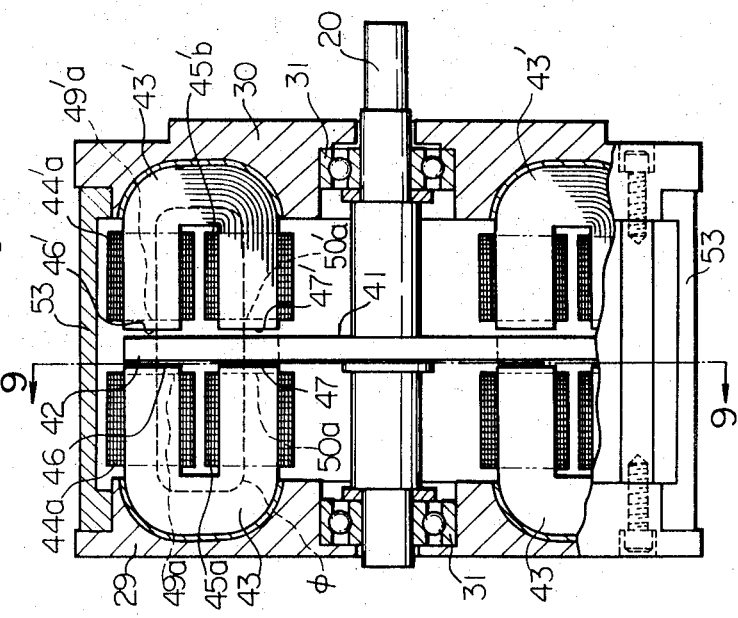

ELECTRIC PULSE MOTOR

The present invention relates to an improved construction of an electric pulse motor.

In the conventional construction of an electric pulse motor it is generally composed of rotor elements having many rotor teeth arranged at equal intervals on the periphery of said rotor, pairs of laminated U shape stator elements which have many stator teeth each facing, the above-mentioned individual rotor teeth and are arranged circumferentially, each pair of said stator element receives a series of command input pulses, and steps the rotor element in order.

For obtaining a large output from the rotor element in the conventional construction of the electric pulse motor, it is necessary to increase the magnetic attractive force which acts between the stator element and the rotor element, that is, to increase the input power which is not only uneconomical but also increases the heat energy generated inside said electric pulse motor.

Another method for obtaining large output power in the conventional construction is to increase the diameter of the rotor element driven by the magnetic attractive force and thereby increase the working area of said magnetic attractive force.

However, in this second method, the follow-up characteristics of the electric pulse motor become inferior, especially, when using the electric pulse motor as an element of a servo-system.

Also, the iron loss in the rotor element increases when the diameter of the rotor element is increased, and the output torque of the electric pulse motor is not proportional to the diameter of the rotor element.

To overcome the above-mentioned drawback, the method of making the rotor element very thin while increasing the diameter of the rotor may be considered. However, when the rotor is made thin, the strength of the rotor teeth decreases thus causing fatigue break down with the long term use and also a vibration noise is generated in the case of high speed revolution. As a result of this, it is necessary to strengthen the rotor teeth.

The object of the present invention relates to the provision of an improved rotor element to increase the output of the electric pulse motor, and especially, provided with strengthened rotor teeth the diameter of which can be increased without increasing the moment of inertia of the rotor element.

Another object of the present invention relates to the provision of improved stator elements which enable increased output of the electric pulse motor to be obtained.

Further features and advantages of the present invention will be apparent from the ensuing description with respect to the accompanying drawing to which, however, the scope of the invention is no way limited.

Figure 10:
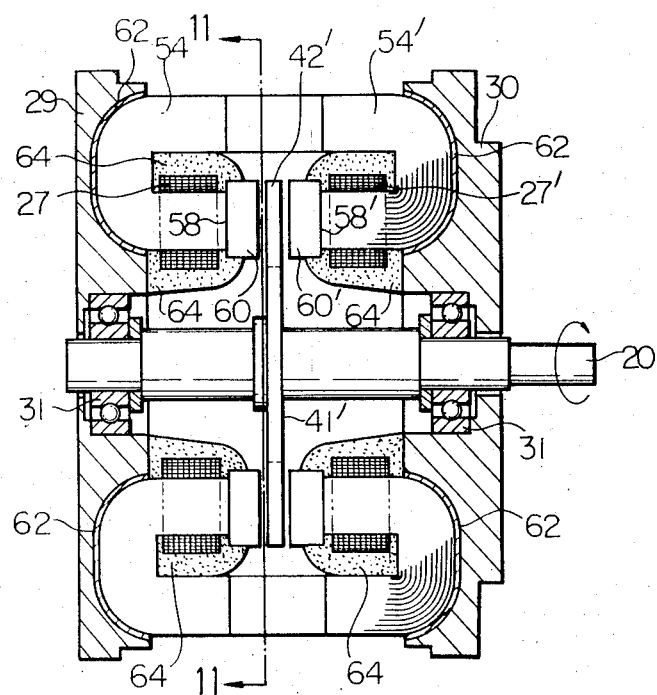
Figure 11:
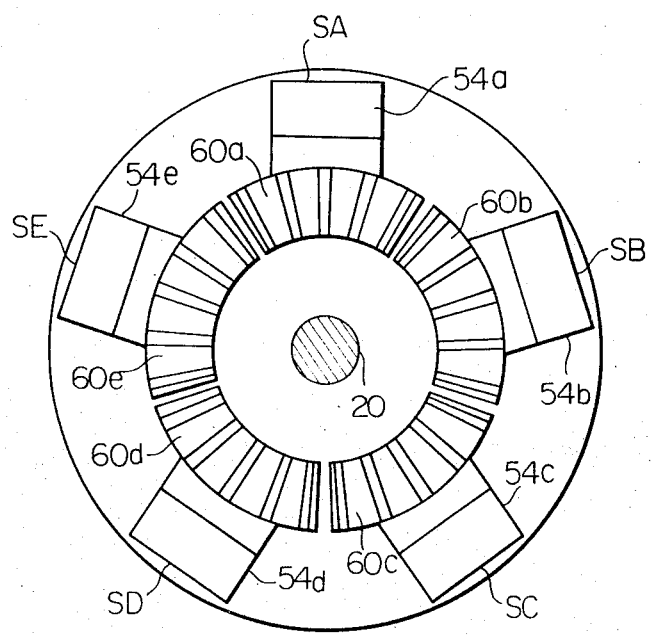

FIG. 1 is a longitudinal sectional view of the construction of the conventional electric pulse motor, FIGS. 2, 3, 4, 5, 6 and 7 are perspective views of the embodiments of strengthened rotor teeth in one embodiment of the electric pulse motor according to the present invention, FIG. 8 is a longitudinal sectional view of another embodiment of the electric pulse motor according to the present invention, FIG. 9 is a sectional view along the line 9 — 9 in FIG. 8, FIG. 10 is a longitudinal sectional view of a further embodiment of the electric pulse motor according to the present invention, FIG. 11 is a sectional view along the line 11 — 11 in FIG. 10, FIGS. 12(A) and 12(B) are perspective views showing the laminated cores according to the present invention.

Referring to FIG. 1 showing the conventional electric pulse motor, the rotor shaft 20 of a rotor element 21 is supported by bearings 31 which are mounted in side plates 29 and 30. Rotor teeth 22 of the rotor element 21 have the thickness in the axial direction and project in the radial direction and are arranged with equal pitch circumferentially.

Opening parts of stator elements 23 and 23' are disposed so as to face the rotor element 21 and are fixed to the side plates 29 and 30 and are formed in a U shape by laminating the magnetic material strip. Magnetic poles 25 and 25' of the stator elements 23 and 23' have gaps in the axial direction and provide a plurality of stator teeth 24 and 24' which face each other with equal pitch. The rotor teeth 22 of the rotor element are positioned between the magnetic poles 25 and 25' of the stator elements 23 and 23'. Stator windings 27 and 27' are provided on the leg portions 26 and 26' of the pair of the stator elements 23 and 23' which face each other and are connected in series or in parallel so as to have the same electrical phase. When the stator windings 27 and 27' are excited by the input current, the magnetic flux shown by the dotted lines P in FIG. 1 is generated whereby the rotor teeth 22 is the magnetic poles 26 and 26' are stepped by magnetic attractive force to the position at which the rotor teeth 22 and stator teeth 24 precisely face each other. A magnetic spacer 32 is provided for supporting the stator elements 23 and 23'.

Figure 2:
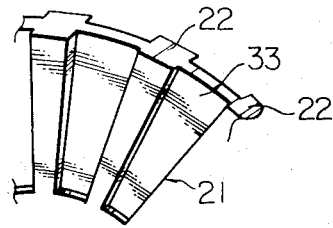

FIGS. 2 - 7 show an embodiment of the construction which strengthens the thin rotor elements which have large diameter, according to the present invention. Referring to FIG. 2, grooves of the rotor teeth 22 are supported by supporting member 33 having a thichness smaller than the rotor teeth 22, and said supporting member 33 is constituted in one body with the rotor teeth or by another member separated from the rotor teeth.

Figure 3:
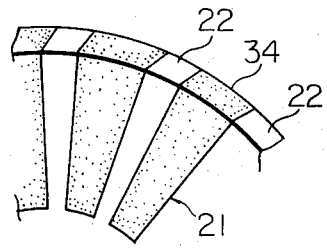

Referring to FIG. 3, the non magnetic material or resin material 34 embeds the grooves of the rotor teeth to the same thickness as the rotor teeth.

Figure 4:
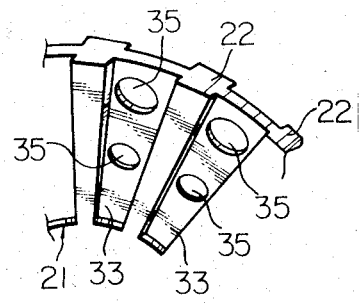
Figure 5:
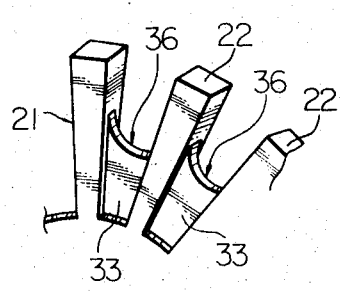
Figure 6:
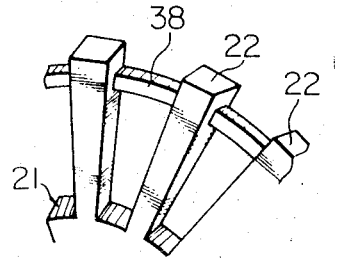
Figure 7:
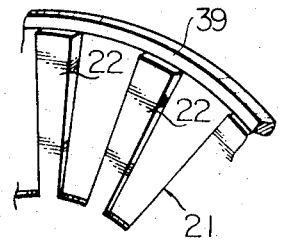

FIG. 4 shows an example in which holes 35 are provided in the thin portion of the supporting member 33 shown in FIG. 2 thus decreasing the weight and the moment of inertia. FIG. 5 is an example in which further decrease of the weight and the moment of the inertia of the example shown in FIG. 4 is achieved by shortened curved portions 36. FIGS. 6 and 7 show examples in which beams 38 and 39 are provided to strengthen the rotor teeth. It will be understood that the constructions shown in FIGS. 2, 4, 5, 6 and 7 are constituted in the same body as the rotor element or separately of some other material. By using the above-mentioned construction for strengthening the rotor elements, the dimensions of the rotor elements can be increased without increasing the moment of inertia of the rotor element or the iron loss generated in said rotor element. And thus the effective working area of the magnetic attraction and the output of the electric pulse motor can be increased.

Another example of the electric pulse motor according to the present invention, is shown in FIGS. 8 and 9 where the laminated U shape stator elements are improved and rotor element based on the illustrations in FIG. 2 and FIGS. 4 – 7 are preferably used. Referring to FIGS. 8 and 9, five pairs of stator elements 43 and 43' are provided circumferentially, and four stator windings 44a, 45a, 44'a and 45'a are provided per one pair of stator elements 43 and 43'. These stator elements are connected in series or in parallel with each other, and constitute one electric phase. Dotted line φ in FIG. 8 show the passage of the flux generated in the stator elements 43 and 43' in the above-mentioned electric phase.

An advantage of this embodiment is that the magnetic attraction for the rotor element 41 act on the outside magnetic poles 46, 46' and on the inside magnetic poles 47 and 47' of the pair of stator elements 43 and 43'. Namely, as shown in FIG. 9. plural stator teeth 49a and 50a are provided on both magnetic poles 46 and 47 of the laminated U shape stator element 43. It will be understood that plural stator teeth 49'a, 50'a are provided on both magnetic poles 46' and 47' of the laminated U shape stator element 43'. Further, in this embodiment, the air gap between the stator elements 43 and 43' is determined by the casing 53.

The rotor teeth 42 of the rotor element 41 are preferably strengthened as mentioned above and lengthened radially in the outward direction, and receive a magnetic attraction force from magnetic poles 46, 46' and 47, 47' of the stator elements 43 and 43'. As a result of this, the torque driving the rotor element 41 can be increased and output power greater than the conventional electric pulse motor can be obtained at the rotor shaft 20. As is clear from the above-mentioned explanation, in this embodiment of the electric pulse motor, the output of the electric pulse motor can be increased without increasing either the dimensions or the electrical input power.

Figure 12:
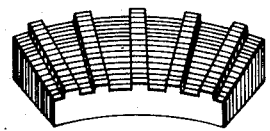
Figure 12:
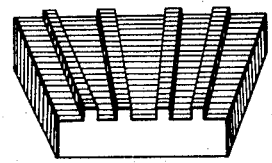

A still further embodiment of the present invention is shown in FIGS. 10 – 12 wherein an explanation is also given of a five phase electric pulse motor. Referring to FIG. 10, five pairs of laminated U shape stator elements 54 and 54' which are fixed to the side plates 29 and 30 with a binding agent 62 form the stator assemblies for five phases shown by SA, SB, SC, SD and SE in FIG. 11. Cores 60 and 60' are fixed to each pole piece portion 58 and 58' of five phase stator assemblies with binding and moulding means, and face each other via a rotor teeth 42'. The advantage of this embodiment is in the addition of said cores 60 and 60' which increase peripherally the number of teeth and increase radially the length of said teeth, thus increasing the magnetic attraction force which is acts between the stator teeth and the rotor teeth.

Because cores 60 and 60' are also composed of laminated magnetic material strips they do not adversely affect the iron loss reducing property of the laminations in the stator elements. Referring to FIG. 10 reference numeral 64 shows the moulding portion, and FIG. 11, 54a, 54b, 54c, 54d, 54e and 60a, 60b, 60c, 60d, 60e show respectively the stator elements and the cores fixed to each pole piece portion.

Each core 60 and 60' fixed to the pole piece portion of the stator element is of laminated construction as shown in FIGS. 12(A) and (B). Referring to FIG. 12(A), all layers of the thin strip of magnetic material wound in circular roll form are bound and insulated from each other with a binding agent such as synthetic resin, the stator teeth are worked by a milling machine, cores 60 and 60' are simply divided the working and the division of the stator teeth are carried out after mounting the roll of thin strip to the stator. Referring to FIG. 12(B), it will be understood that the same construction as in FIG. 12(A) is obtained by laminating the thin band of the magnetic material in a fan-shape. By fixing the above-mentioned cores to the magnetic pole piece portion of the stator, the effective area of the magnetic pole piece portion of the stator can be considerably increased, the number and the radial length of the teeth can be increased, and the output torque generated at the rotor shaft can be considerably increased.

What is claimed is:

1. An electric pulse motor comprising:
a single rotor having a rotor shaft and a plurality of radially extending rotor teeth spaced at equal tooth pitch on a hub which is formed unitary with said rotor teeth and is mounted on the rotor shaft, said rotor further having supporting members, each of which is disposed between adjacent rotor teeth for providing a physical connection between said adjacent rotor teeth;
side plate means comprising a pair of plates;
bearing means mounted on each said plate for rotatably supporting said monostage rotor between said plates;
a stator including a plurality of geometrically and electrically paired U-shaped stator elements mounted stationary in said side plate means while maintaining predetermined spaces between different paired stator elements, said paired U-shaped stator elements consisting of a pair of U-shaped stator cores, each made of U-shaped magnetic material laminations, said paired U-shaped stator cores having stator teeth formed on at least a pair of mutually opposing end surfaces thereof to axially face said rotor teeth, and;
excitation winding means wound on each said stator core.

2. An electric pulse motor as claimed in claim 1, wherein said paired U-shaped stator cores have stator teeth formed on both pairs of mutually opposing end surfaces thereof for providing an outer magnetic pole pair and an inner magnetic pole pair along said radially extending rotor teeth.

3. An electric pulse motor as claimed in claim 2, further comprising a cylindrical casing arranged between said side plate means to define air gaps between said magnetic poles of said U-shaped stator cores and said rotor teeth.

4. An electric pulse motor as claimed in claim 1, further comprising core members fixed on said pair of mutually opposing end surfaces of said paired U-shaped stator cores, each of said core members being made of radially laminated magnetic material and having a surface provided with said stator teeth formed thereon to axially face said rotor teeth.

5. An electric pulse motor as claimed in claim 1, wherein said supporting members are integral of said rotor teeth.

6. An electric pulse motor as claimed in claim 1, wherein said supporting members are resin material embedded in the spaces between adjacent rotor teeth so as to have the same axial thickness as said rotor teeth.

7. An electric pulse motor as claimed in claim 1, wherein said supporting members consist of a rim-shaped beam disposed on tops of said rotor teeth.

8. An electric pulse motor as claimed in claim 5, wherein said supporting members have openings for decreasing weight and the moment of inertia.

9. An electric pulse motor as claimed in claim 5, wherein said supporting members are formed as shortened curved portions.

10. An electric pulse motor as claimed in claim 5, wherein said supporting members comprise rim-shaped beam members disposed between said rotor teeth.

* * * * *